(No Model.)
H. C. REGISTER.
DENTAL ENGINE.
No. 534,841. Patented Feb. 26, 1895.
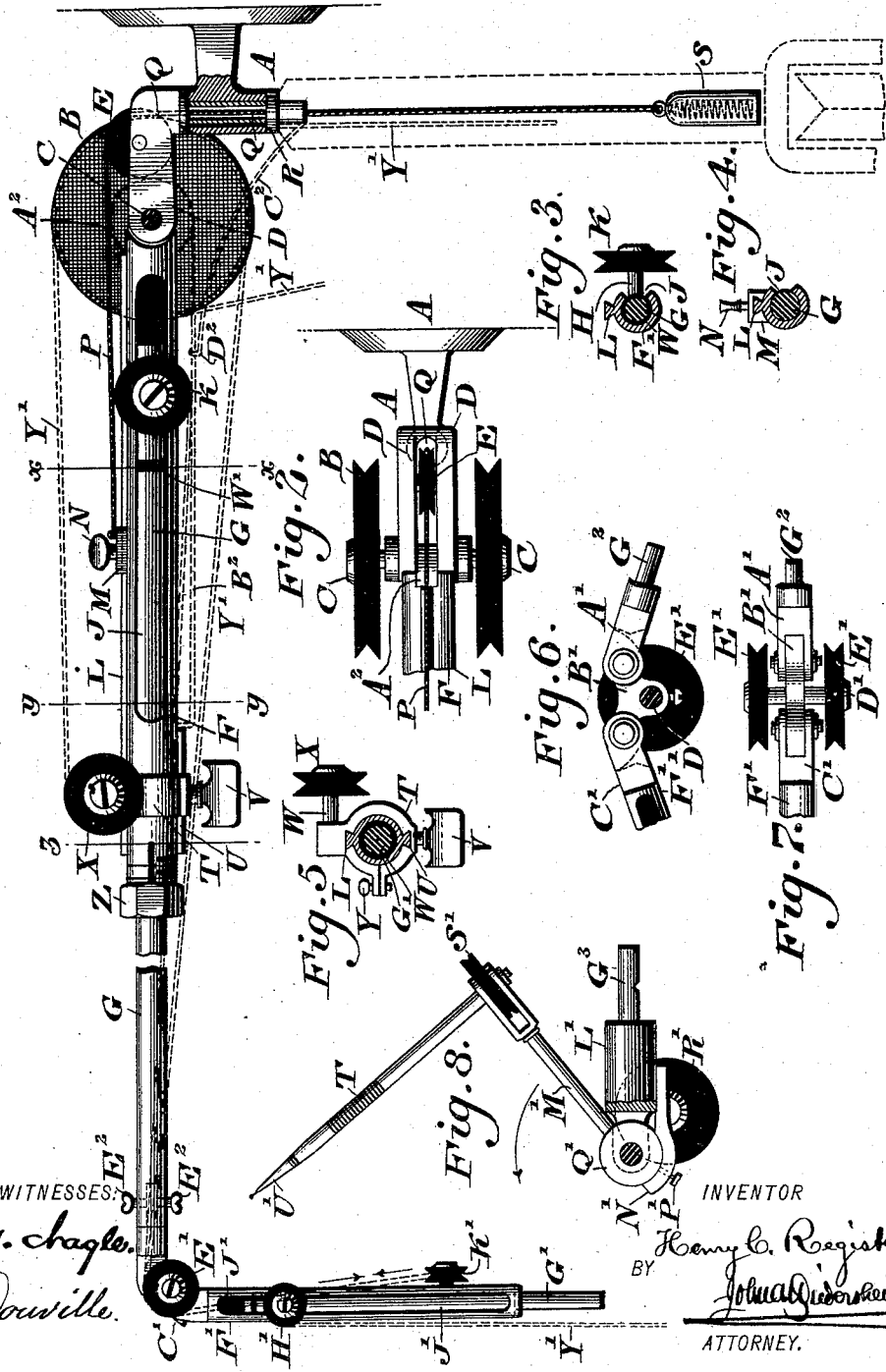
WITNESSES:
O. H. Chagle
L. Douville
INVENTOR
Henry C. Register
BY
Joshua Biederman
ATTORNEY.

UNITED STATES PATENT OFFICE.

HENRY C. REGISTER, OF PHILADELPHIA, PENNSYLVANIA.

DENTAL ENGINE.

SPECIFICATION forming part of Letters Patent No. 534,841, dated February 26, 1895.

Application filed December 12, 1893. Serial No. 493,487. (No model.)

*To all whom it may concern:*

Be it known that I, HENRY C. REGISTER, a citizen of the United States, residing in the city and county of Philadelphia, State of Pennsylvania, have invented a new and useful Improvement in Dental Engines, which improvement is fully set forth in the following specification and accompanying drawings.

My invention consists of a dental engine whose arms may be adjusted or placed at various angles, and retained in their adjusted position, the means employed being hereinafter set forth.

It also consists of means for adjusting the tension of the operating belt, as hereinafter set forth.

Figure 1 represents a partial side elevation and partial vertical section of a dental engine embodying my invention. Fig. 2 represents a top view of a detached portion thereof. Figs. 3, 4, and 5 represent sections respectively on lines $x,x$, $y,y$, and $z,z$, Fig. 1. Fig. 6 represents a partial side elevation and partial section of knuckles, on an enlarged scale, to be hereinafter explained. Fig. 7 represents a top view thereof. Fig. 8 represents a partial side elevation and partial section of an interchangeable portion on an enlarged scale. Fig. 9 represents a side elevation of the flexible shaft, hand piece and tool.

Similar letters of reference indicate corresponding parts in the several figures.

Referring to the drawings, A designates a bracket which is adapted to be secured to a wall or other support, and B designates pulleys which are connected with a shaft C whose bearings are on the arms D of said bracket, said arms having also mounted upon them the pulley E.

F designates a raising and lowering tube crane, the inner end of which has its axis on the shaft C, and receives within the same, telescopically, the rod or tube G, whose inner end has connected with it the shaft H, the latter projecting from said rod through the longitudinal slot J in the side of the tube F, said shaft H having mounted upon it the pulley K.

On the tube F is a longitudinally-extending dovetail spline L, on which is fitted the dovetail slide M, which is provided with a set screw N, whose point is adapted to engage with said spline for holding said slide in adjusted position.

Connected with the slide is a cord P, which passes around the pulley E, and through the tube Q, which depends from the arms D, and enters the boss R of the bracket A, said tube acting as a journal, whereby the arms D and parts supported thereon may be turned laterally.

Connected with the cord P is a weight S, whose object is to counterbalance the weight of the parts mounted on the axis or shaft C, it being seen that the slide M may be moved nearer to or farther from said axis in order to adjust the counterbalancing action of said weight, so that the tube F, and parts supported thereon may be placed in equilibrium, and thus retain the position to which the same may be raised or lowered.

On the tube F, near the outer end thereof, is an adjustable sleeve T, whose upper portion freely engages with the spline L, and whose lower portion freely engages with the spline U on said tube F, whereby while the sleeve may be moved to and fro on the tube, it is prevented from turning thereon. Connected with the sleeve is a screw V, which is adapted to tighten against the spline U, or other proper portion of the tube for retaining the latter in adjusted position. Connected with said collar T is a laterally-projecting shaft W, on which is mounted the pulley X, said collar being also split or divided and provided with a screw Y, whereby the collar may be tightened on the tube, the loosening of said screw permitting the collar to be opened to assist in removing the same from the tube when so required.

The forward end of the tube is split, and the sections thereof threaded on the exterior thereof for the engagement of the nut Z, whereby said end may be contracted and thus tightened on the rod G, it being noticed that when said end is relieved of the action of the nut Z, the arm formed by the tube F, and the rod G, may be increased or decreased in length by moving said rod out of or into the tube F, as the case may be, after which the nut is tightened and the arm retains its adjusted length.

The rod G has attached to its outer end the knuckle A', which is mounted on the ear B', on which are also mounted the knuckle C' and the shaft D', the latter having pulleys E' secured thereto, the knuckle A' being formed with an attaching stem G².

The knuckle C' is connected with the tube F', within which is telescopically fitted the rod or tube G', it being evident that owing to the knuckles C' and A' and the ear B' said tube F' and rod G' which together constituting a fore-arm may be readily turned on the rod G, and raised and lowered and swung to the right and left with great freedom, the knuckles forming an elbow. The rod G' carries on the end within the tube F', the pulley H', whose shaft passes freely through the slot J' in the side of said rod, it being evident that the rod G' may be moved into and out of the tube F', thus increasing or decreasing the length of the arm formed by said rod and tube. On the side of the tube F' is a pulley K', whose shaft is connected with said tube.

To the end of the rod G' is attached the collar L', on which is mounted the arm M', and to which is secured the shoe N', which carries a screw P' whose point is adapted to bear against the head Q' of said arm M', around the axis thereof, for the purpose of holding said arm in adjusted position. On said collar L' is mounted the pulley R', and on the arm M' is mounted the pulley S', whose shaft is connected with the flexible shaft T', the latter having the hand piece U' of a dental tool or instrument attached to the end thereof.

The rod G has packing W' on the periphery thereof, so as to increase the frictional contact of the same with the tube F.

The rod G' has packing X' on the periphery thereof, so as to increase the frictional contact of the same with the tube F'.

If desired the tube Q may be fitted in a standard, the latter having a base or foot which rests on the floor, said standard being represented by dotted lines Fig. 1, in which case the bracket A may be dispensed with.

An endless belt is employed for transmitting the power of the driving pulley to one of the pulleys B, said belt being shown in dotted lines as at Y', the same passing from said pulley B around the pulley X, the pulley K, one of the pulleys E', the pulley K', the pulley H', one of the pulleys R', the pulley S', and the remaining pulleys R', E', and B, and returns to the driving pulley, by which provision the instrument is operated in a reliable and effective manner.

When the tension of the belt Y', requires to be adjusted or varied, the sleeve T is moved to the right or left, as the case may be, until the belt is properly taut, when the screw V is tightened and the parts retain their adjusted position.

Secured to the axis C is a head A² to which is connected a rod B², which passes forward from said head under the tube F, and is attached at its forward end to said tube. A spring C² is secured to the tubular journal Q, and rising therefrom has its upper end provided with an eye D², which freely receives the rod B² and exerts pressure upwardly thereon, and consequently on the tube F, so as to counteract the weight of the arm formed by the tube F and connected parts, and assist in retaining said arm in adjusted position. The head A², rod B², spring C² and eyes D² are shown in dotted lines Fig. 1.

If desired, the sleeve T may be reversed so as to place the pulley X on the under side of the tube F, in which the belt Y' will require to be adjusted to pass around said pulley in its reverse position.

The fore-arm may be removed and substituted by the parts shown in Fig. 8, in which case the collar L' is provided with a stem G³, which latter is inserted in the end of the part G of the arm, and held therein by the screws E². When the fore-arm is restored, the screws E² tighten against the stem G², and hold the elbow connected with the parts of the arm and fore-arm.

Having thus described my invention, what I claim as new, and desire to secure by Letters Patent, is—

1. In a dental engine, a bracket with a hollow boss, arms with a depending tube laterally movable in said boss, a swinging crane with its axis mounted on said arms, a cord connected with said crane and passing through said depending tube, and a weight on said cord, said parts being combined substantially as described.

2. In a dental engine, arms having a depending tube suitably journaled, a swinging crane with its axis mounted in said arms, a rod connected to a head on said axis and to said swinging crane, a spring connected to said depending tube and bearing against said rod, an adjustable slide on said crane and a weighted cord connected with said slide and passing through said tube, said parts being combined substantially as described.

3. In a dental engine, arms having a depending tube suitably journaled, a shaft mounted in said arms, pulleys mounted on said shaft, a swinging crane with axis on said shaft an arm in said crane having a shaft projecting from a slot in said tube and carrying a pulley, a collar adjustable on said tube having a shaft with a pulley thereon, and a belt passing around said pulleys, substantially as described.

4. A dental engine having arms with a depending tube, a bracket supporting said tube, a swinging crane mounted on said arms, a slide on said crane, a pulley on said arms in rear of said crane and a weighted cord connected with said slide and passing through said tube, said parts being combined substantially as described.

5. In a dental engine, the combination with two adjacent arms thereof, of a knuckle joint comprising an ear carrying pivots, and provided with a journal bearing, knuckles mounted on said pivots and connected with said arms, a shaft mounted on said ear, and guide pulleys carried by said shaft, substantially as described.

6. In a dental engine, a rod forming part of an extensible arm thereof, a collar on said rod, a swinging arm connected with said collar and provided with a head, a shoe connected with said collar and bearing against said head a pulley mounted on said collar, a pulley mounted on the end of said arm and a flexible shaft connected with the shaft of the last mentioned pulley, and adapted to carry a dental tool, said parts being combined substantially as described.

7. A dental engine having an extensible arm formed of parts fitted to each other telescopically, and packing interposed between said parts, substantially as described.

HENRY C. REGISTER.

Witnesses:
JOHN A. WIEDERSHEIM,
R. A. GRAESER.